(12) United States Patent
Kimura et al.

(10) Patent No.: US 7,014,021 B2
(45) Date of Patent: Mar. 21, 2006

(54) FLUID COUPLING

(75) Inventors: Katsumi Kimura, Tokyo (JP); Kazuo Hattori, Tokyo (JP); Hiroshi Ogata, Tokyo (JP); Yoshinori Kataya, Tokyo (JP); Kazuhiko Sugiyama, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 10/432,602

(22) PCT Filed: Dec. 4, 2001

(86) PCT No.: PCT/JP01/10589

§ 371 (c)(1),
(2), (4) Date: Nov. 7, 2003

(87) PCT Pub. No.: WO02/46634

PCT Pub. Date: Jun. 13, 2002

(65) Prior Publication Data

US 2004/0074727 A1    Apr. 22, 2004

(30) Foreign Application Priority Data

Dec. 4, 2000    (JP)    .............................. 2000-368151

(51) Int. Cl.
*F16H 45/02*    (2006.01)
*F16D 25/0638*    (2006.01)

(52) U.S. Cl. ............... 192/3.29; 192/30 W; 192/109 R
(58) Field of Classification Search ................. 192/57, 192/3.29, 3.3, 3.31, 3.32, 3.33, 105 A, 105 F, 192/103 F, 109 R, 30 W
See application file for complete search history.

(56) References Cited

U.S. PATENT DOCUMENTS

| | | | |
|---|---|---|---|
| 2,210,416 A | 8/1940 | Kiep et al. | |
| 4,583,626 A | 4/1986 | Spridco | |
| 5,406,792 A | 4/1995 | Kimura et al. | |
| 5,850,897 A | 12/1998 | Kimura et al. | |
| 6,016,984 A * | 1/2000 | Trafton et al. | ............ 242/348.1 |
| 6,040,768 A * | 3/2000 | Drexl | ......................... 73/118.1 |
| 6,267,212 B1 * | 7/2001 | Gierling | .................... 192/3.29 |

FOREIGN PATENT DOCUMENTS

| | | |
|---|---|---|
| EP | 0 508 528 A1 | 10/1992 |
| EP | 0 748 946 A1 | 12/1996 |
| JP | 5-118352 | 5/1993 |
| JP | 5-164149 A * | 6/1993 |
| JP | 8-338503 | 12/1996 |
| JP | 2001-173753 | 6/2001 |

* cited by examiner

*Primary Examiner*—Rodney H. Bonck
(74) *Attorney, Agent, or Firm*—Westerman, Hattori, Daniels & Adrian, LLP

(57) ABSTRACT

A fluid coupling transmits power from a drive side to a driven side by utilizing kinetic energy of fluid such as oil. The fluid coupling comprises a pump impeller (4) provided on a drive shaft (1), a turbine impeller (5) provided on a driven shaft (9), a housing (20) fixed to the pump impeller (4) and surrounding the turbine impeller, and a multiple disc clutch provided between a drive shaft side and a driven shaft side. The multiple disc clutch is operated to couple the drive shaft (1) and the driven shaft (9) mechanically so that the drive shaft and the driven shaft are rotated at the same rotational speed. Thus, the fluid coupling can improve a power transmitting efficiency because of no slip between the rotational speed of the drive shaft and the rotational speed of the driven shaft.

6 Claims, 7 Drawing Sheets

FLUID COUPLING

TECHNICAL FIELD

The present invention relates to a fluid coupling for transmitting power from a drive side to a driven side by utilizing kinetic energy of fluid such as oil, and more particularly to a fluid coupling which has a clutch mechanism for mechanically coupling a drive shaft coupled to a prime mover and a driven shaft coupled to a driven machine and can improve a power transmitting efficiency by equalizing the rotational speed of the driven shaft to the rotational speed of the drive shaft without any slip loss.

BACKGROUND ART

There has been known a fluid coupling which has a pump impeller connected to a drive shaft and a turbine impeller connected to a driven shaft and transmits power from the drive shaft to the driven shaft via fluid filled in a casing.

In case of performing a rotational speed control by means of a fluid coupling, the rotational speed on a load side can be steplessly changed from a minimum rotational speed to a maximum rotational speed by using a scoop tube, or a minimum rotational speed or a maximum rotational speed on a load side can be obtained by feeding a working fluid such as working oil to a coupling section of the fluid coupling or interrupting the feeding of the working fluid to the coupling section.

In either case, when the driven shaft is rotated at a maximum rotational speed, the maximum rotational speed of the driven shaft is normally lower than an input rotational speed of the prime mover such as a motor or an engine by about 2 to 3% due to slippage. This slippage cannot be avoided when the rotational speed on the load side is controlled by the fluid coupling.

Specifically, when the coupling section of the fluid coupling is filled with the working fluid up to 100%, the rotational speed of the driven shaft reaches 97 to 98% of the rotational speed of the drive shaft, and hence power loss is no more than 2 to 3% due to slippage of the rotational speed. Therefore, special measures for reducing the power loss caused by slippage have not been taken.

However, energy-saving has been highlighted in recent years, and slippage between the drive shaft and the driven shaft in the fluid coupling is considered to be the subject of the energy-saving, and hence there is a demand for eliminating such slippage generated when the fluid coupling is operated at a high rotational speed, thus achieving energy-saving.

DISCLOSURE OF INVENTION

It is therefore an object of the present invention to provide a fluid coupling which has a clutch mechanism between a drive shaft side and a driven shaft side and can improve a power transmitting efficiency by equalizing the rotational speed of a driven shaft coupled to a driven machine to the rotational speed of a drive shaft coupled to a prime mover without any slip loss.

In order to achieve the above object, according to the present invention, there is provided a fluid coupling comprising: a pump impeller provided on a drive shaft; a turbine impeller provided on a driven shaft; a housing fixed to the pump impeller and surrounding the turbine impeller; and a multiple disc clutch provided between a drive shaft side and a driven shaft side, the multiple disc clutch being operated to couple the drive shaft and the driven shaft mechanically so that the drive shaft and the driven shaft are rotated at the same rotational speed.

According to the present invention, the clutch is provided between the drive shaft side and the driven shaft side in the fluid coupling, and the clutch is operated to mechanically connect the drive shaft and the driven shaft after the rotational speed of the driven shaft reaches a maximum, thereby mechanically coupling the drive shaft and the driven shaft to eliminate slippage between the drive shaft and the driven shaft. The clutch comprises a multiple disc clutch which has a simple structure and can be controlled easily, and the clutch can be connected or disconnected by a fluid pressure such as an oil pressure.

In a preferred aspect of the present invention, the stroke of the piston for pressing the clutch plates (friction plates) in the multiple disc clutch incorporated in the fluid coupling is limited.

With this arrangement, when the wear of the clutch plates (friction plates) exceeds a predetermined value, even if the piston moves in a full stroke, a friction force for transmitting power by the friction plates cannot be exerted.

In a preferred aspect of the present invention, detecting apparatuses for detecting rotational speeds are provided on the drive shaft and the driven shaft. When the differential between the rotational speed of the drive shaft and the rotational speed of the driven shaft is generated due to slippage between the drive shaft and the driven shaft while the piston is pressed against the clutch plates, such differential is detected by the detecting apparatuses. Thus, the state in which the wear of the clutch plates (friction plates) reaches a predetermined value can be detected.

The above and other objects, features, and advantages of the present invention will be apparent from the following description when taken in conjunction with the accompanying drawings which illustrates preferred embodiments of the present invention by way of example

BEST MODE FOR CARRYING OUT THE INVENTION

A fluid coupling according to a first embodiment of the present invention will be described with reference to FIGS. 1 and 2.

The fluid coupling of the present invention has a multiple disc clutch between a drive shaft side and a driven shaft side. When a pressurized fluid such as pressurized oil is supplied to a hydraulic cylinder, the multiple disc clutch is pressed against each other, thus connecting the clutch. In this case, as a method for producing a pressurized fluid, there are a method in which a pressure produced by a centrifugal force applied to oil which rotates together with a drive-side rotating body is utilized, a method in which an oil pressure produced by a hydraulic pump which is mechanically connected to a drive shaft is utilized, and a method in which an oil pressure produced by a hydraulic pump which is driven by an electric motor is utilized. The fluid coupling shown in FIGS. 1 and 2 utilizes a pressure produced by a centrifugal force applied to oil which rotates together with a drive-side rotating body.

Figure 1:
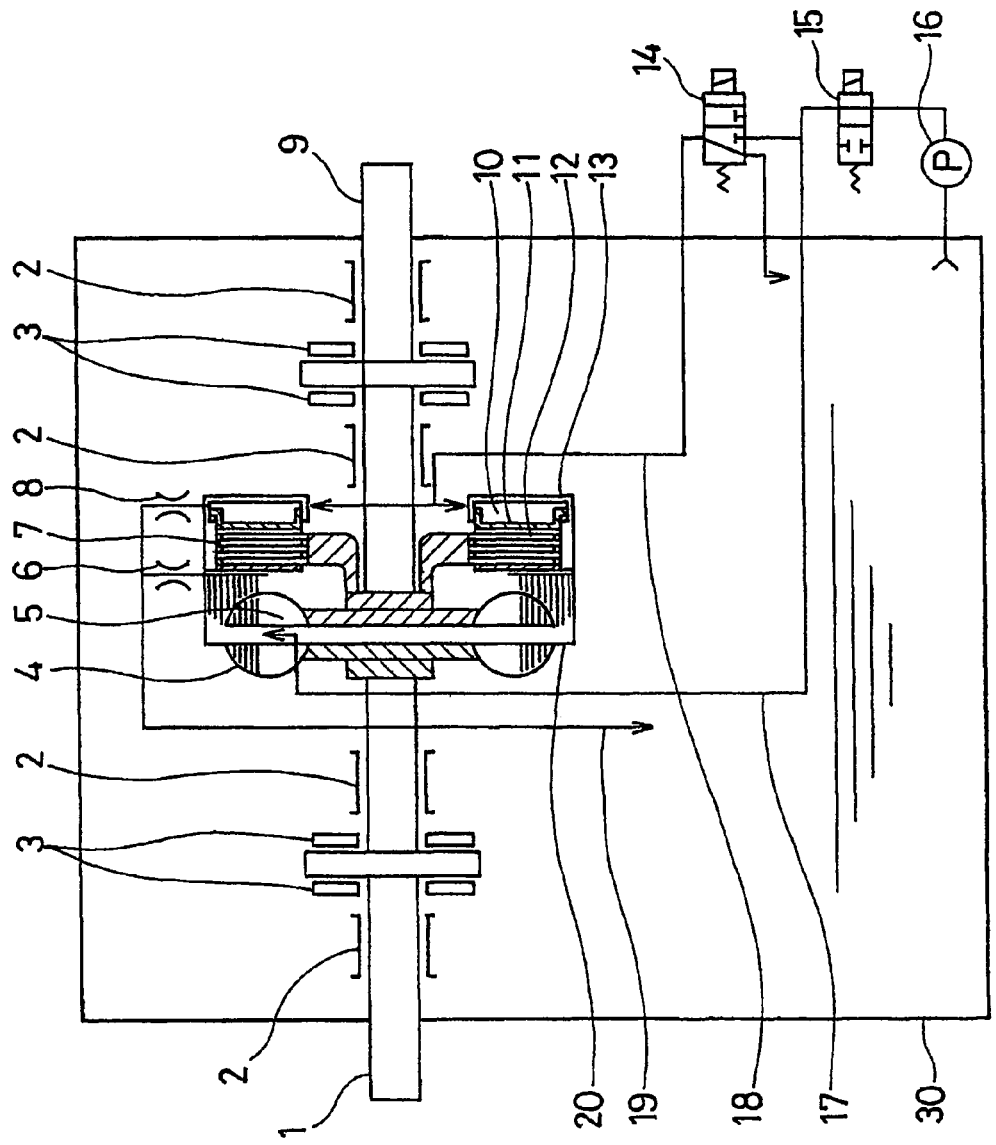
FIG. 1 is a schematic view showing a whole structure of a fluid coupling having a multiple disc clutch according to a first embodiment of the present invention.

As shown in FIG. 1, a drive shaft 1 is rotatably supported by radial bearings 2 and thrust bearings 3. A pump impeller 4, a fluid-coupling housing 20 and a clutch housing 13 are fixed to the forward end of the drive shaft 1. In the clutch housing 13, there are provided a plurality of drive-side friction plates 7 and a clutch piston 11. A cylinder chamber 10 is defined by the clutch housing 13 and the clutch piston 11.

A driven shaft 9 is disposed adjacent to the drive shaft 1, and is rotatably supported by radial bearings 2 and thrust bearings 3. A turbine impeller (runner) 5 is fixed to the forward end of the driven shaft 9, and is disposed so as to face the pump impeller 4. A plurality of driven-side friction plates 12 are provided on the driven shaft 9, and these driven-side friction plates 12 are arranged so as to alternate with the drive-side friction plates 7 in the clutch housing 13. The drive-side friction plates 7 and the driven-side friction plates 12 which serve as clutch plates and are alternately arranged jointly constitute a multiple disc clutch. A stationary plate 22 is fixedly provided in the clutch housing 13 (see FIG. 2).

As shown in FIG. 1, a working fluid such as working oil is stored in a lower portion of a fluid-coupling casing 30. The working fluid in the fluid-coupling casing 30 is pumped by a pump 16 mechanically connected to the drive shaft 11 and is supplied under substantially non-pressure to the pump impeller 4 of the fluid coupling via a fluid-coupling solenoid controlled valve 15.

FIG. 1 shows the state in which the working oil is pumped by the pump 16 by energizing the fluid-coupling solenoid controlled valve 15, and is supplied to the pump impeller 4. Kinetic energy is given to the supplied oil by the pump impeller 4, and then such oil impinges upon the turbine impeller 5 to give energy to the turbine impeller 5, thereby transmitting power from the drive shaft 1 to the driven shaft 9. The working oil supplied to the fluid-coupling housing 20 which houses the pump impeller 4 and the turbine impeller 5 is discharged by a centrifugal force produced by rotation of the housing 20 from a discharge nozzle 6 provided in the outer peripheral portion of the fluid-coupling housing 20. The discharged working oil is returned to the lower portion of the fluid-coupling casing 30.

Because an amount of the working oil supplied through a supply pipe 17 is larger than an amount of the working oil discharged from the discharge nozzle 6, the fluid-coupling housing 20 is rapidly filled with the working oil, and the rotational speed of the driven shaft 9 is quickly increased and reaches a maximum within a short time of less than five seconds. When the driven shaft 9 is rotated at the maximum rotational speed, 2 to 3% of slippage is generated between the drive shaft 1 and the driven shaft 9. In this state, the working oil is supplied to the cylinder chamber 10 in the clutch housing 13 by energizing a clutch solenoid controlled valve 14, and the working oil which has nt red the cylinder chamber 10 begins to rotate at substantially the same rotational speed as that of the clutch housing 13 due to friction between the working oil and the inner surface of the clutch housing 13 and the surface of the clutch piston 11. Therefore, a centrifugal pressure is developed by a centrifugal force produced by rotation of the working oil in the cylinder chamber 10, and is applied to the clutch piston 11 which is in turn pushed forward, thus pressing the drive-side friction plates 7 against the driven-side friction plates 12 in the multiple disc clutch. Because the drive-side friction plates 7 and the driven-side friction plates 12 are arranged in an alternate row, the driven-side friction plates 12 are rotated at the same rotational speed as that of the drive-side friction plates 7. Thus, the drive shaft 1 and the driven shaft 9 rotate at the same rotational speed without any slip, and power is transmitted from the drive shaft 1 to the driven shaft 9.

A discharge nozzle 8 is provided in the outer peripheral portion of the clutch housing 13, and the working oil in the cylinder chamber 10 is always discharged little by little from the discharge nozzle 8 by rotation of the drive shaft 1. Therefore, when energization of the clutch solenoid controlled valve 14 is stopped, the working oil does not remain in the cylinder chamber 10. As a result, a force for pressing the drive-side friction plates 7 by the clutch piston 11 disappears, and the mechanical coupling of the multiple disc clutch is released.

Figure 2:
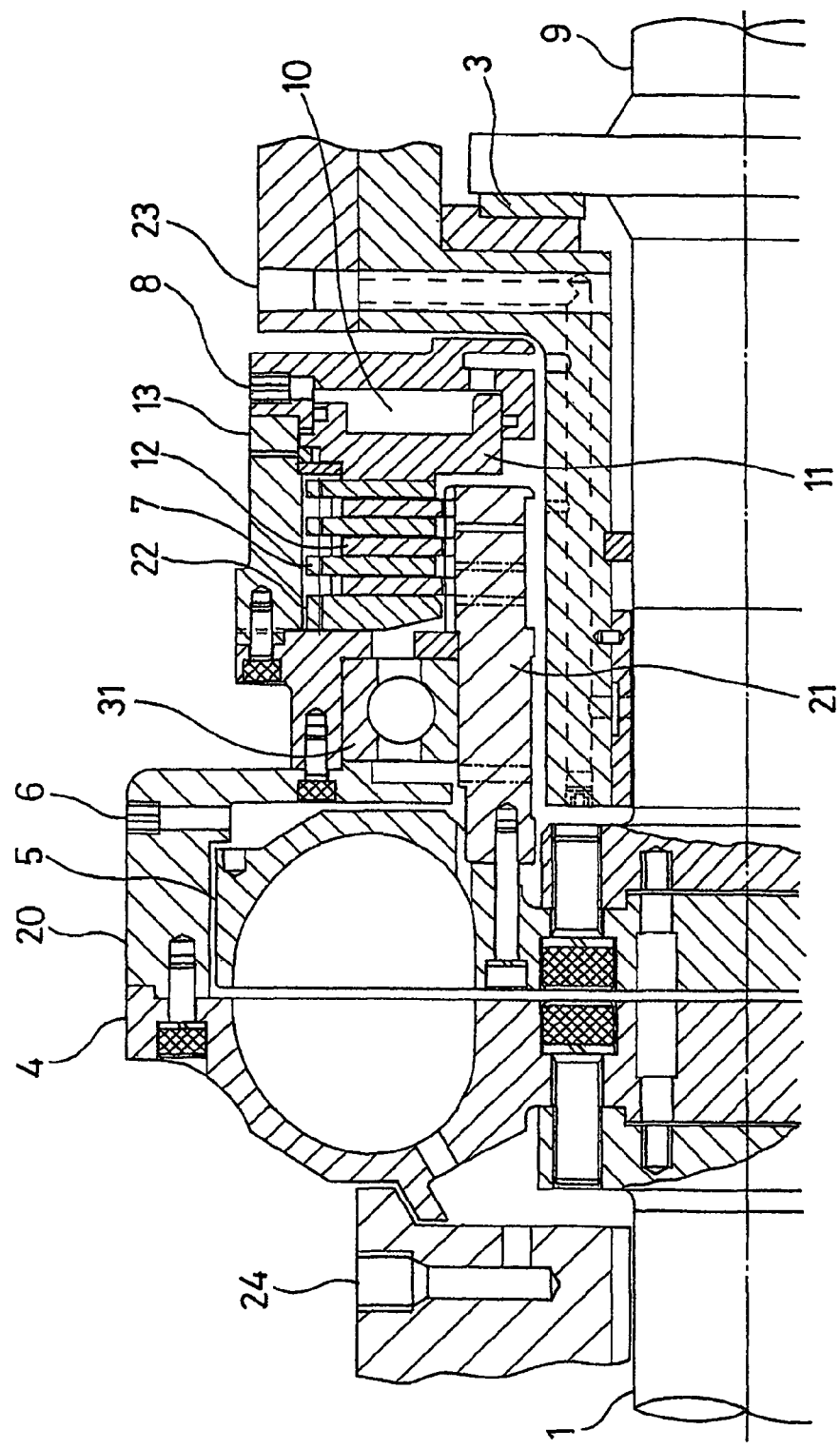
FIG. 2 is a cross-sectional view of a power transmitting section of the fluid coupling according to the first embodiment of the present invention.

FIG. 2 is a cross-sectional view of a power transmitting section of the fluid coupling having the multiple disc clutch therein according to the present invention. As shown in FIG. 2, the clutch housing 13 is fixed to the fluid-coupling housing 20 and a clutch hub 21 is fixed to the turbine impeller 5. The drive-side friction plates 7 are held by the clutch housing 13 so as to be movable in an axial direction of the drive shaft 1. The driven-side friction plates 12 are held by the clutch hub 21 so as to be movable in an axial direction of the driven shaft 9. To be more specific, the drive-side friction plates 7 are rotated together with the clutch housing 13, but are movable in an axial direction of the clutch housing 13. The driven-side friction plate 12 are rotated together with the clutch hub 21, but are movable in an axial direction of the clutch hub 21.

The clutch piston 11 is disposed in the clutch housing 13. When the working oil is supplied to the cylinder chamber 10 in the clutch housing 13, a centrifugal pressure is developed in the clutch chamber 10, and hence the drive-side friction plates 7 are pressed against the driven-side friction plates 12. Thus, the multiple disc clutch becomes in a coupling or connecting state. Therefore, the drive shaft 1 and the driven shaft 9 are rotated at the same rotational speed without any slip. Further, a radial bearing 31 is provided between the clutch housing 13 and the clutch hub 21.

In the fluid coupling having the above structure, the working oil supplied from an oil inlet 24 formed in the casing enters the pump impeller 4 fixed to the drive shaft 1, and energy is given to the working oil by the pump impeller 4, and then the working oil enters the turbine impeller 5, thereby transmitting power from the drive shaft 1 to the driven shaft 9. The discharge nozzle 6 is attached to the fluid-coupling housing 20. When supply of the working oil to the oil inlet 24 is stopped, the working oil which has resided in the pump impeller 4 and the turbine impeller 5 is discharged therefrom and does not remain therein, and thus the power transmission is not performed.

In the state in which the drive shaft 1 and the clutch housing 13 are rotated, the working oil is supplied from an oil inlet 23 to the cylinder chamber 10, and the working oil in the cylinder chamber 10 is rotated to develop a pressure by a centrifugal force of the working oil. Thus, the clutch piston 11 is pushed forward by this pressure to press the drive-side friction plates 7 against the driven-side friction plates 12. As a result, the drive shaft 1 and the driven shaft 9 are mechanically coupled, and the drive shaft 1 and the driven shaft 9 are rotated at the same speed without any slip, and power is transmitted from the drive shaft 1 to the driven shaft 9.

Because the working oil in the cylinder chamber 10 is always discharged from the discharge nozzle 8, when supply of the working oil to the oil inlet 23 is stopped, the mechanical coupling of the drive shaft 1 and the driven shaft 9 is released.

Figure 3:
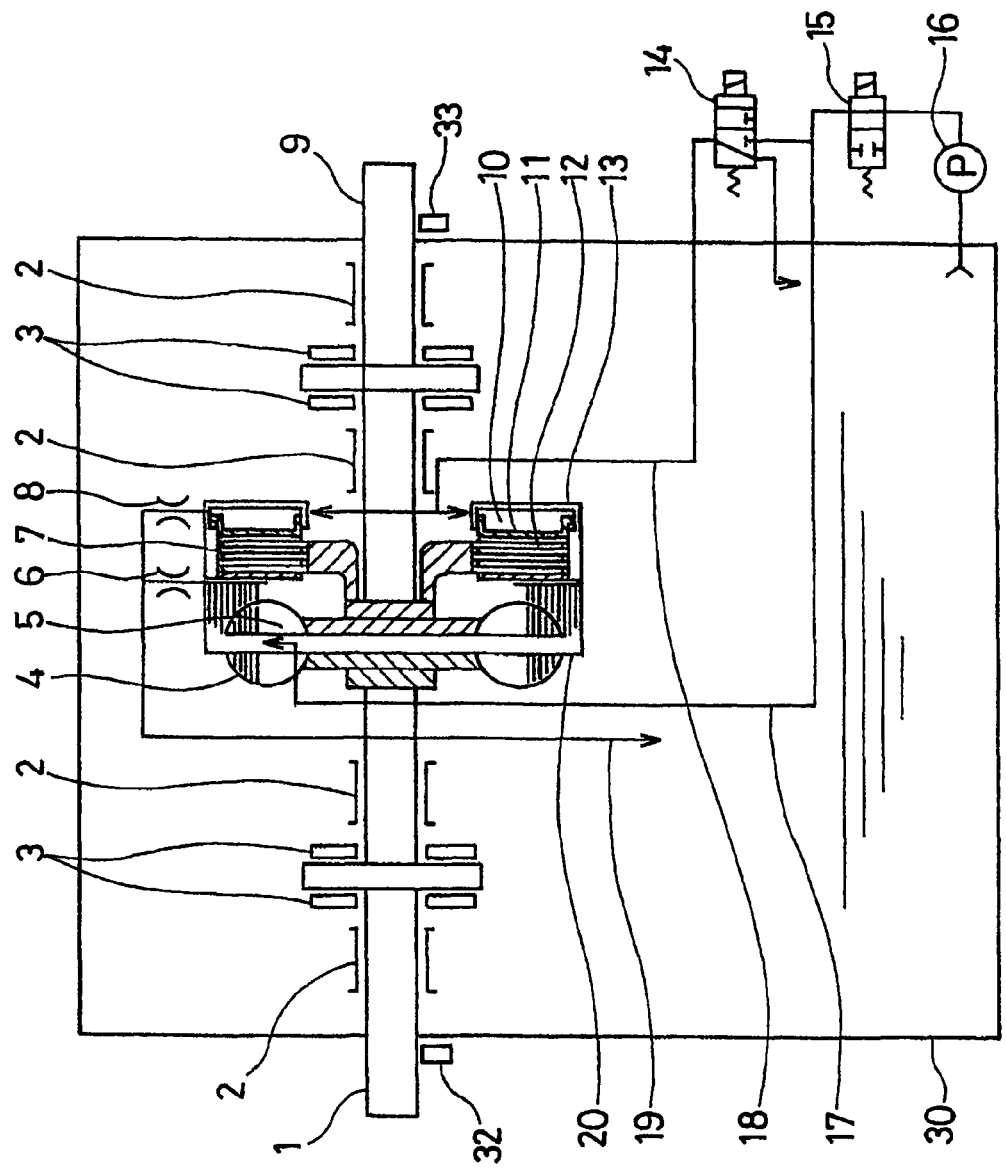
FIG. 3 is a schematic view showing a whole structure of a fluid coupling having a multiple disc clutch according to a second embodiment of the present invention.
Figure 4:
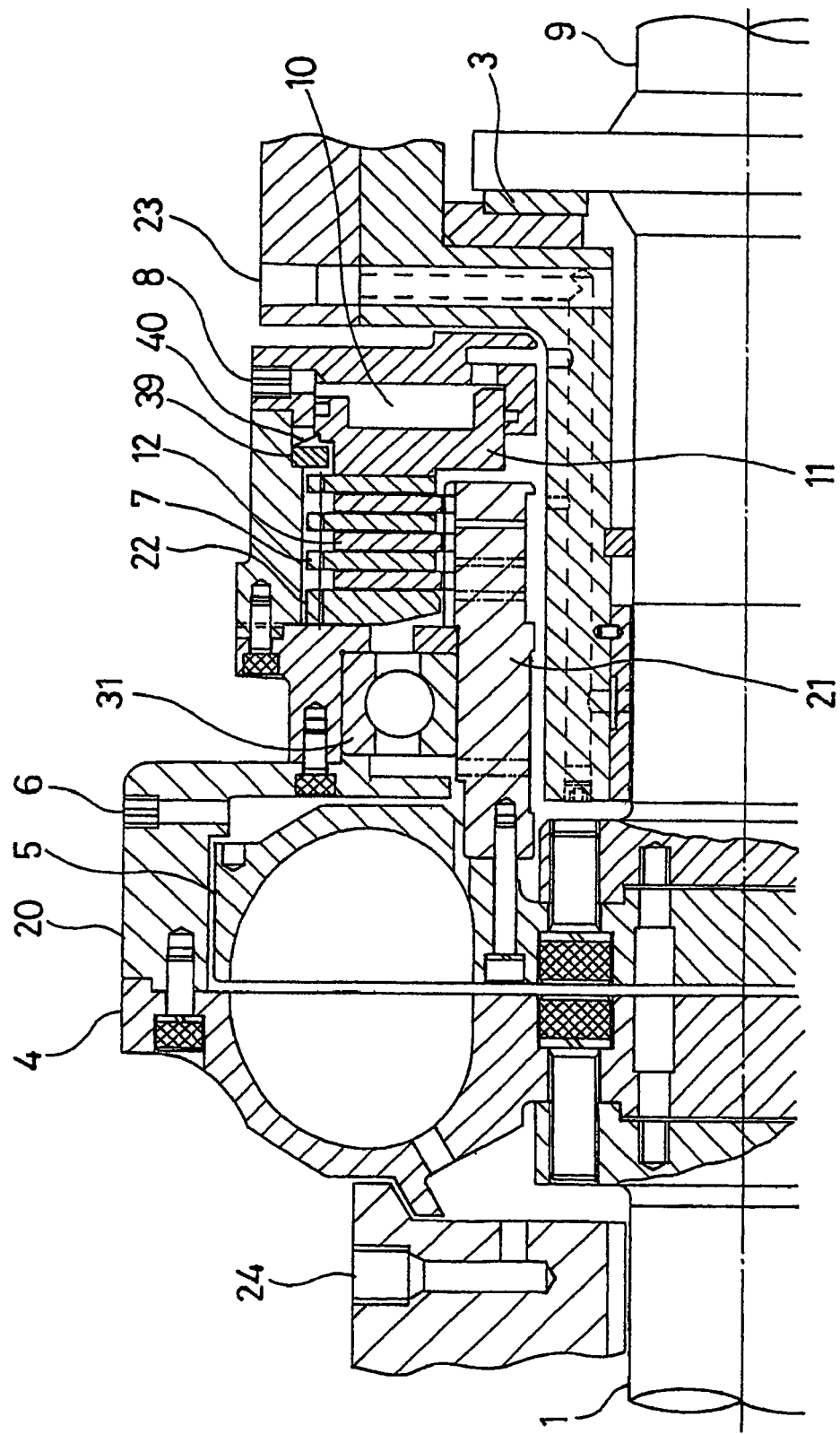
FIG. 4 is a cross-sectional view of a power transmitting section of the fluid coupling according to the second embodiment of the present invention.
Figure 5:
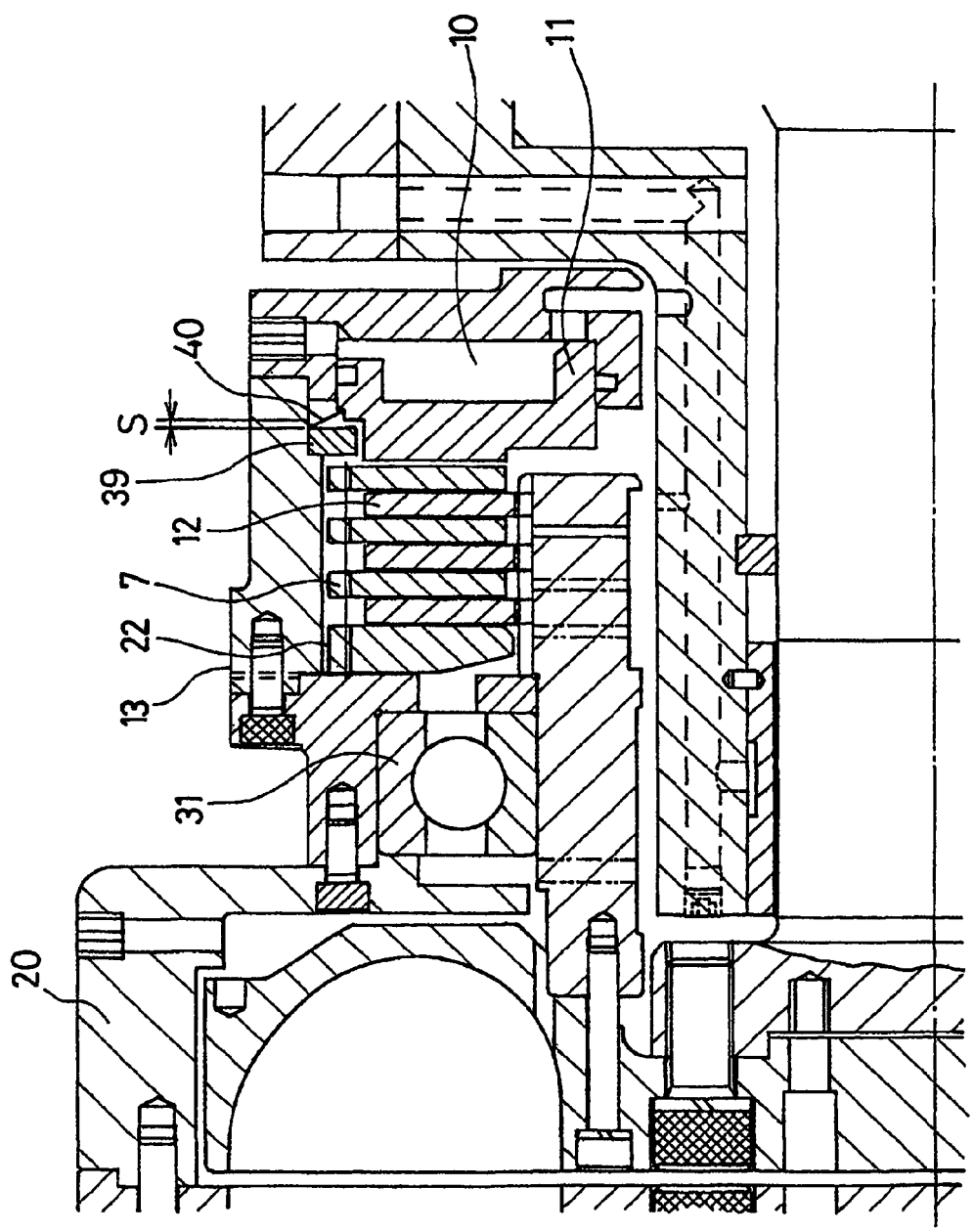
FIG. 5 is a cross-sectional view of the multiple disc clutch according to the second embodiment of the present invention.

FIGS. 3 through 5 are views showing a fluid coupling according to the second embodiment of the present invention. FIG. 3 is a schematic view of the fluid coupling having a multiple disc clutch therein, FIG. 4 is a cross-sectional view of a power transmitting section of the fluid coupling, and FIG. 5 is a cross-sectional view of the multiple disc clutch. In the fluid coupling shown in FIGS. 3 through 5, there are provided a device for limiting a stroke of the piston for pressing the clutch plates of the multiple disc clutch in the fluid coupling, and a device for detecting an amount of wear of the friction plates of the multiple disc clutch.

In FIGS. 3 through 5, the parts or elements which are identical to those shown in FIGS. 1 and 2 are denoted by the same reference numerals.

The structure of the fluid coupling shown in FIG. 3 is almost the same as the fluid coupling shown in FIG. 1. As shown in FIG. 3, a detecting apparatus 32 for detecting a rotational speed of a drive shaft is attached to the drive shaft 1, and a detecting apparatus 33 for detecting a rotational speed of a driven shaft is attach d to the driven shaft 9.

If the differential between the rotational speed of the drive shaft 1 and the rotational speed of the driven shaft 9 is generated, then the detecting apparatus s 32 and 33 issue a warning to notify the wear of the friction plates.

A paper based frictional material having a large coefficient of friction and a thickness of about 1 to 2 mm is attached to the surfaces of the drive-side friction plate 7 and the driven-side friction plate 12, or sintered alloy is deposited on the surfaces of the drive-side friction plate 7 and the driven-side friction plate 12.

Further, as shown in FIGS. 4 and 5, a stroke adjustment washer 39 and a coned disk spring 40 are interposed between the clutch housing 13 and the clutch piston 11. Other structure of the fluid coupling shown in FIGS. 3 through 5 is the same as that of the fluid coupling shown in FIGS. 1 and 2.

FIG. 4 is a view showing the state in which the clutch solenoid controlled valve 14 is energized and the working oil is supplied to the cylinder chamber 10 to press the friction plates against each other by the clutch piston 11, thereby connecting the multiple disc clutch mechanically. Specifically, in the state shown in FIG. 4, the clutch solenoid controlled valve 14 is energized and the drive-side friction plates 7 are pressed against the driven-side friction plates 12 by the clutch piston 11 to mechanically connect the multiple disc clutch, and hence the drive shaft 1 and the driven shaft 9 are rotated at the same rotational speed, and power is transmitted from the drive shaft 1 to the driven shaft 9. The discharge nozzle 8 is provided in the outer peripheral portion of the clutch housing 13 which constitutes the outer circumference of the cylinder chamber 10, and the working oil in the cylinder chamber 10 is always discharged little by little to the exterior by rotation of the drive shaft 1. Therefore, when energization of the clutch solenoid controlled valve 14 is stopped, the working fluid is discharged from the cylinder chamber 10 and does not remain therein, and the force for pressing the drive-side friction plates 7 against the driven-side friction plates 12 by the clutch piston 11 disappears. Therefore, the clutch piston 11 is pushed back by the urging force of the coned disk spring 40 located between the stroke adjustment washer 39 and the clutch piston 11, and hence the mechanical coupling of the multiple disc clutch is released.

FIG. 5 is a cross-sectional view of the multiple disc clutch section, and shows the state in which the multiple disc clutch is released. Specifically, in the state shown in FIG. 5, energization of the clutch solenoid controlled valve 14 is stopped, the clutch piston 11 having a predetermined set stroke (S), e.g. 5 mm is pushed back by the urging force of the coned disk spring 40, and the multiple disc clutch is disconnected.

According to the present embodiment, as shown in FIGS. 3 through 5, the stroke of the clutch piston 11 for pressing the clutch plates (friction plates) in the multi-dick clutch incorporated in the fluid coupling is limited by the stroke adjustment washer 39. Therefore, when the amount of wear of the clutch plates (friction plates) exceeds a predetermined value, even if the clutch piston 11 moves in a full stroke, the friction force for transmitting power by the friction plates cannot be exerted.

Further, the detecting apparatus 32 for detecting a rotational speed of a drive shaft is provided on the drive shaft 1, and the detecting apparatus 33 for detecting a rotational speed of a driven shaft is provided on the driven shaft 9. Therefore, when the differential between the rotational speed of the drive shaft 1 and the rotational speed of the driven shaft 9 is generated due to the slippage between the drive shaft 1 and the driven shaft 9, the detecting apparatuses 32 and 33 detect the wear of the clutch plates (friction plates) which reaches a predetermined value, and issues a warning. The detecting apparatus s 32 and 33 may b combined to construct a single detecting apparatus for detecting the differential between the rotational speed of the drive shaft 1 and the rotational speed of the driven shaft 9.

Figure 6:
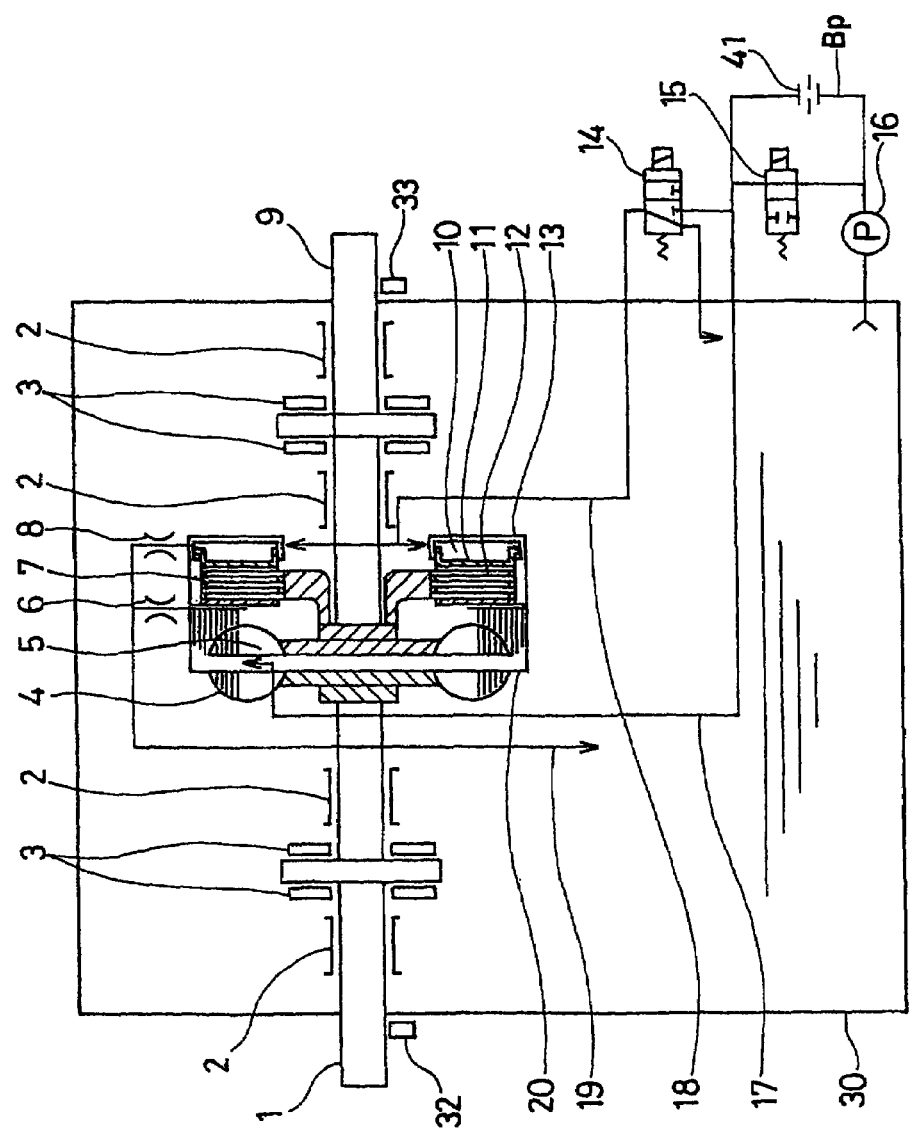
FIG. 6 is a schematic view showing a whole structure of a fluid coupling having a multiple disc clutch according to a third embodiment of the present invention.
Figure 7:
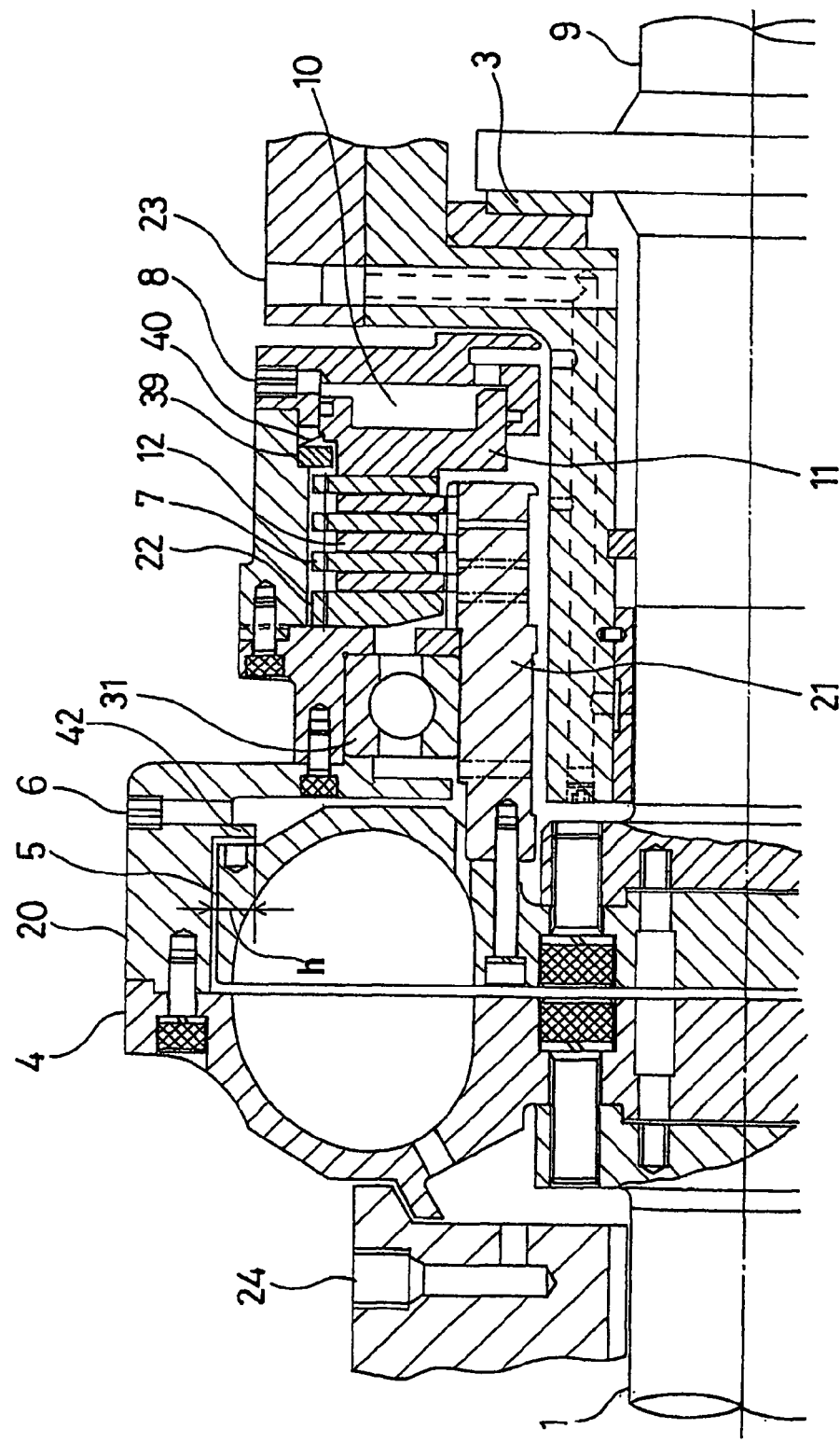
FIG. 7 is a cross-sectional view of a power transmitting section of the fluid coupling according to the third embodiment of the present invention.

FIGS. 6 and 7 are views showing a fluid coupling according to the third embodiment of the present invention. FIG. 6 is a schematic view of the fluid coupling having a multiple disc clutch therein, and FIG. 7 is a cross-sectional view of a power transmitting section of the fluid coupling.

In the embodiment shown in FIGS. 6 and 7, at a certain location of the supply pipe 17, there is provided a bypass passage Bp, having an orifice 41 for setting a minimum amount of the working oil, which is bypassed from a main passage which has the fluid-coupling solenoid controlled valve 15 (see FIG. 6). Further, at the location inside of the discharge nozzle 6, there is provided a dam 42 which projects radially inwardly from the inner wall surface of the fluid-coupling housing 20 (see FIG. 7). A minimum rotational speed of the fluid coupling can be set by the dam 42. Specifically, the minimum rotational speed of the fluid coupling can be adjusted by changing the height h of the dam 42 from the inner wall surface of the fluid-coupling housing 20, and hence the dam 42 constitutes a minimum rotational speed setting dam.

In the embodiment shown in FIGS. 6 and 7, the fluid-coupling solenoid controlled valve 15 is closed during the minimum rotational speed operation, and the amount of the working oil determined by the orifice 41 is supplied to the working oil chamber comprised by the pump impeller 4, the turbine impeller (runner) 5 and the fluid-coupling housing 20, and then the supplied working oil overflows the dam 42. Thereafter, the working oil is discharged from the discharge nozzle 6 and is returned to the lower portion of the fluid-coupling casing 30. At this time, the amount of the working oil supplied through the orifice 41 to the working oil chamber is smaller than the amount of the working oil discharged through the discharge nozzle 6 from the working oil chamber, and hence the driven shaft 9 is rotated at the minimum rotational speed determined by the amount of the working oil, within the working oil chamber, which is set by the height h of the dam 42.

When the fluid-coupling solenoid controlled valve 15 is energized and opened, because the amount of the working oil supplied through the fluid-coupling solenoid controlled valve 15 and the orifice 41 to the working oil chamber is larger than the amount of the working oil which is discharged through the discharge nozzle 6 from the working oil chamber, the working oil chamber is rapidly filled with the working oil. Thus, the rotational speed of the driven shaft 9 is rapidly increased and reaches a maximum within a short time of less than five seconds. This maximum rotational speed of the driven shaft 9 corresponds to the speed subtracted from the rotational speed of the drive shaft 1 by the amount of slippage. In this state, the clutch solenoid controlled valve 14 is energized, and the clutch is connected. As a result, the drive shaft 1 and the driven shaft 9 are mechanically coupled, and the drive shaft 1 and the driven shaft 9 are rotated at the same speed without any slip.

The rapid acceleration-type fluid coupling having the minimum oil amount setting orifice and the minimum rotational speed setting dam is particularly suitable for the usage in which the response time from the minimum rotational speed to the maximum rotational speed and the response time from the maximum rotational speed to the minimum rotational speed are required to be extremely short. That is, this rapid acceleration-type fluid coupling is suitable for the rotational speed control of a driven machine which repeats frequently load running and non-load running, for example, a pump for a descaling apparatus in a hot rolling system.

As shown in FIGS. 6 and 7, by incorporating the clutch mechanism of the present invention into the rapid acceleration-type fluid coupling, after the driven shaft reaches a maximum rotational speed, the clutch is connected to eliminate the slippage between the drive shaft and the driven shaft, and hence great energy-saving can be achieved.

In the embodiments shown in FIGS. 1 through 7, as a device for pressing the clutch plates in the multiple disc clutch, an oil pressure generated by a centrifugal force caused by rotation of the drive-side rotating body is applied to the clutch plate pressing chamber (cylinder chamber 10) to press the clutch plates against each other, thereby mechanically coupling the drive shaft 1 and the driven shaft 9. However, the following devices may be employed for pressing the clutch plates.

(1) As a device for pressing the clutch plates in the multiple disc clutch, an oil pressure developed by a hydraulic pump driven by the drive shaft is applied to the clutch plate pressing chamber (cylinder chamber 10) to press the clutch plates, thereby mechanically coupling the drive shaft and the driven shaft.

(2) As a device for pressing the clutch plates in the multiple disc clutch, an oil pressure developed by a hydraulic pump driven by an electric motor is applied to the clutch plate pressing chamber (cylinder chamber 10) to press the clutch plates, thereby mechanically coupling the drive shaft and the driven shaft.

As described above, according to the fluid coupling of the present invention, although a large-sized rotating machine can be started or stopped easily as with the conventional fluid coupling, after the large-sized rotating machine is started and then reaches a predetermined rotational speed, the drive shaft and the driven shaft in the fluid coupling can be mechanically connected, thus eliminating any slip and achieving energy-saving.

Further, according to the present invention, even if the wear of the paper based friction material or the sintered alloy applied to the surfaces of the drive-side friction plate and the driven-side friction plate in the multiple disc clutch incorporated in the fluid coupling is generated, the friction plates can be replaced with new friction plates before ground metal of the friction plates is exposed. This is because the slippage between the drive shaft and the driven shaft in the fluid coupling can be detected. The friction plates whose friction material has been worn away can be repaired and reutilized.

Although certain preferred embodiments of the present invention have been shown and described in detail, it should be understood that various changes and modifications may be made therein without departing from the scope of the appended claims.

INDUSTRIAL APPLICABILITY

The present invention is applicable to a fluid coupling for transmitting power from a drive side such as prime mover to a driven side such as a driven machine by utilizing kinetic energy of fluid such as oil, and more particularly to a fluid coupling which is used for a pump for a descaling apparatus in a hot rolling system.

The invention claimed is:
1. A fluid coupling comprising:
a pump impeller provided on a drive shaft;
a turbine impeller provided on a driven shaft;
a housing fixed to said pump impeller and surrounding said turbine impeller;
a multiple disc clutch provided between a drive shaft side and a driven shaft side, said multiple disc clutch being operated to couple said drive shaft and said driven shaft mechanically so that said drive shaft and said driven shaft are rotated at the same rotational speed;
a pressing device for pressing clutch plates in said multiple disc clutch;
said pressing device comprising:
a clutch plate pressing chamber to which a fluid pressure is applied;
a piston provided in said clutch plate pressing chamber for pressing said clutch plates; and
a device for limiting a stroke of said piston;
wherein when the amount of wear of said clutch plates exceeds a predetermined value, the stroke of said piston is limited by said device so that the frictional force for transmitting power by said clutch plates cannot be exerted to generate a differential between a rotational speed of said drive shaft and a rotational speed of said driven shaft.

2. A fluid coupling according to claim 1, wherein said fluid pressure is generated by a centrifugal force developed by rotation of a drive-side rotating body.

3. A fluid coupling according to claim 1, wherein said fluid pressure is generated by a hydraulic pump driven by said drive shaft.

4. A fluid coupling according to claim 1, wherein said fluid pressure is generated by a hydraulic pump driven by a motor.

5. A fluid coupling according to claim 1, further comprising a stroke adjustment device for adjusting said stroke of said piston.

6. A fluid coupling according to claim 1, further comprising a detecting apparatus for detecting said differential.

* * * * *